# 2,860,091

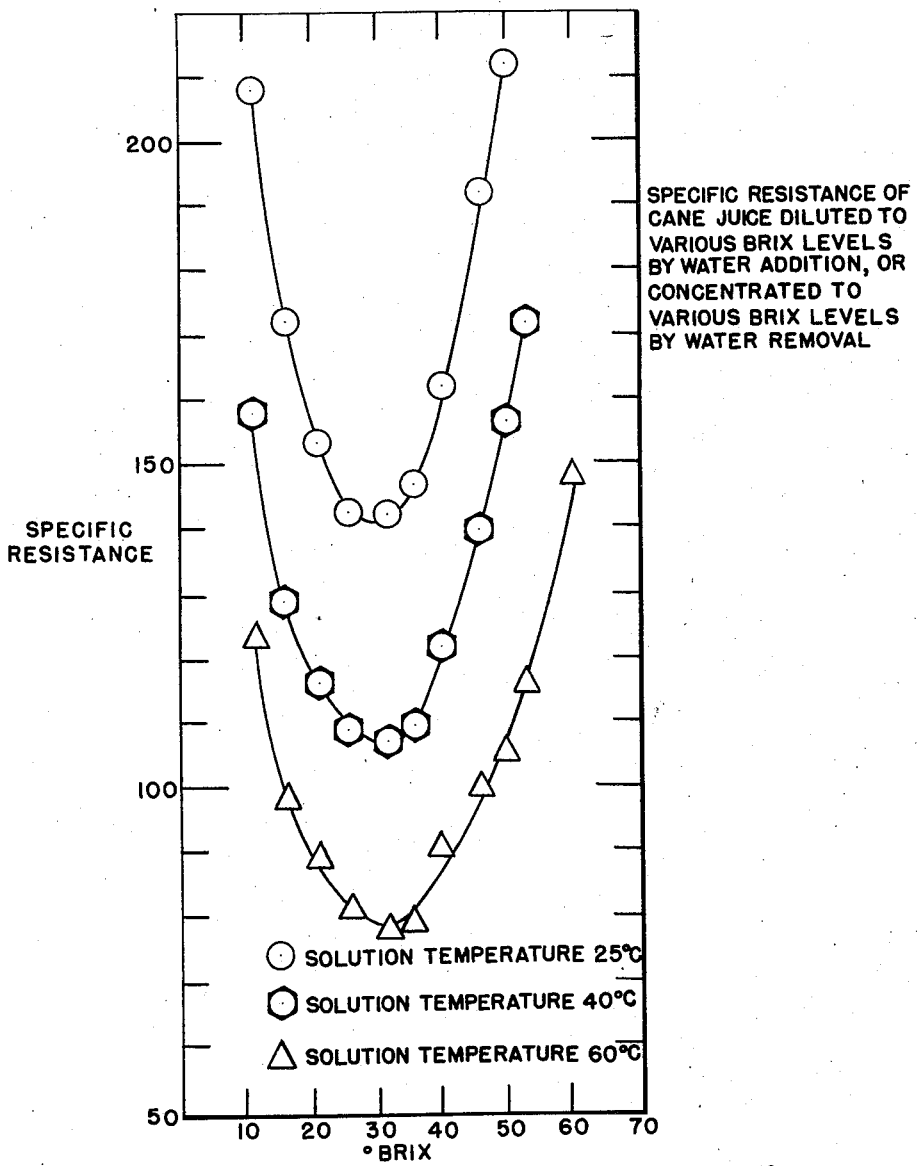

TREATMENT OF POLYHYDRIC SOLUTIONS

Norman W. Rosenberg, Newton Center, Mass., assignor to Ionics, Incorporated, Cambridge, Mass., a corporation of Massachusetts Application September 22, 1955, Serial No. 535,804

7 Claims. (Cl. 204—138)

This invention relates to processes for electrically demineralizing normally viscous aqueous liquids such as syrups, molasses, glycerine, aqueous mannitol and sorbitol and other aqueous solutions of unionized polyhydric materials and may be applied inter alia to sacchariferous solutions of e. g. saccharose, levulose, sorbose, mannose, maltose, fructose, dextrose, molasses of the cane sugar and beet sugar industry, starch hydrolysates, malt extracts, wood sugar solutions, etc. The invention here disclosed makes use of subject matter disclosed in copending U. S. patent applications Serial Nos. 300,302 to Katz and Rosenberg and 329,639 to McRae, now Patent No. 2,777,811, filed July 22, 1952, and January 5, 1953, respectively; and U. S. Patent Nos. 2,708,658 and 2,694,680 issued July 18, 1952, and November 13, 1954, respectively.

In its usual design, a multi-chamber demineralizing apparatus consists of a large number (perhaps several hundred) alternately-spaced anion and cation permselective membranes with spacer members therebetween. The spacer members usually have tortuous paths which, when in face-to-face contact with the membranes, form the concentrating and diluting chambers of the demineralizer. The end chambers of the apparatus contain the electrodes for passing a direct current across all the chambers. The process streams and electrode wash streams are passed through their respective chambers from manifolds and are controlled as to rate of flow, pressure, temperature, etc. Such apparatus, permselective membranes, and modes of operation are disclosed in applicant's copending application Serial No. 428,072, filed April 29, 1954.

It is well known that in the processing of sugar beets, sugar cane, and other saccharides, the presence of organic and inorganic salts in the process sugar solutions interferes with the recovery of sugar. To overcome these difficulties, it has heretofore been proposed to deionize the sacchariferous process solutions by passing them through ion-exchange resin beds. Objections to this procedure include the following:

(a) Owing to the necessity for regenerating and washing, dilute sugar solutions are produced which, for economic reasons, must be recovered. The cost of recovery in many cases offsets any gains from the exchange treatment.

(b) The high cost of chemical regeneration for solutions containing appreciable quantities of salts.

(c) The production of monosaccharides from poly- or di-saccharides by the catalytic atcion of the acid-form cation exchangers. In general, the monosaccharides themselves inhibit the crystallization of higher sugars and constitute in addition a direct loss of the higher sugars. For example, dextrose and fructose resulting from acid catalysis of sucrose inhibit the recovery of sucrose. It is clear that there is no gain in removing one inhibitor and adding another.

(d) The accidental leakage of acid (or alkali) into the treated sugar solution owing to insufficient rinsing, channeling of rinse, etc.

(e) The high molecular weight charged impurities usually of natural origin, present in such solutions are irreversibly bound by the exchangers, particularly the anion exchangers (which is unfortunately much more expensive than the cation exchanger), and are removed if at all only with considerable effort and expense. This effect is evidenced by a rapid loss of capacity of the exchangers and an increasing consumption of chemicals required for regeneration.

For these and other reasons the ion-exchange treatment of sugar and other polyhydric materials has not been widely accepted.

It is proposed herein to demineralize electrically said polyhydric solutions by means of a multi-membrane system of the character noted above.

It is apparent that many of the problems encountered in the granular ion-exchange deionization of polyhydric solutions occur in altered form in membrane demineralization. Among these are—

(a) The diffusion of the polyhydric ion-electrolyte from the dilute to the concentrate chambers through the membranes. The diffusion constitutes a loss of sugar which may offset any gains resulting from demineralization. This problem has been solved by operating at high current densities so as to reduce to a minimum the time available for diffusion.

(b) The irreversible absorption of charged polymeric matter on the membranes resulting in increased resistance to the passage of current and therefore in increased energy consumption. It has been found that this effect becomes most profound when polarizing current densities are employed, the resistance of the demineralizer increasing rapidly and steadily to impractical values. Polarizing current densities are discussed more fully below and in the above-cited Rosenberg application.

(c) The tendency for bubbles to form or lodge in the dilute chambers is great. These restrict the hydraulic flow and are not easily dislodged resulting in rapid depletion of conducting species in the stream and leading thereby to anomalous polarization, i. e., polarization which would not be expected on the basis of the average current density and average concentration in the demineralizer. This difficulty has been overcome by maintaining the flow in the dilute chambers at an apparent superficial linear velocity in excess of 5 centimeters per second which seemingly is sufficient to dislodge any bubbles which may form.

Superficial velocity as used in this application refers to the ratio of the volumetric rate of flow to the cross sectional area available for flow. For example, if the tortuous path in a spacer member has a width of 1 cm. and a thickness of 0.1 cm. and the flow rate is 2.5 cc. per second, then the superficial velocity is 25 cm. per second.

(d) Concentrated aqueous solutions of polyhydric materials which contain a minor component of electrolytes have a low equivalent conductance owing primarily to the high viscosity. This phenomena operates against the process in two ways. First, the electrical resistance is so much greater than for a water solution having the same concentration of electrolyte, that the electrical energy consumption is greatly increased. (The viscosity of a 60° Brix solution is about fifty times that of water at room temperature.) Secondly, the maximum ion-polarizing current density is reduced to the same extent as the equivalent conductance tending toward specific electrolyte transfer rates which are so low as to make the investment cost impractically high. These objections have been overcome as will be more formally set forth below by operating in the preferred form at concentrations in the range of 20° to 40° Brix and at temperature up to 60° C. or even higher.

(e) The cost of pumping the normally viscous solutions is excessively high. This has been overcome by operating at temperatures up to 60° C. or even up to 90° C.

It is apparent that for economy of capital investment, the highest possible current density is desired. The latter corresponds to the highest electrolyte transfer rate which may be expressed, for example, as pounds of ash per hour per square foot of membrane. However, at each operating condition (with regard to flow rate, temperature, electrolyte and non-electrolyte concentration, etc.) there is a current density above which the electrical resistance of the demineralizer becomes abnormally high, and current efficiencies fall sharply. This value is referred to herein as the "polarizing current density." It is believed that at this value the solution region of the membrane-solution interface in the diluting chambers becomes depleted in highly dissociated and therefore highly conductive electrolyte specie and, thereafter conduction depends on the dissociation of water and weakly conductive electrolytes. The latter may comprise large or multiple-charged ions (such as proteins and carboxylic acids resulting from the oxidation of saccharides) which may be more or less irreversibly held by the membranes resulting in abnormally high membrane resistance. High molecular weight weakly conducting materials in cane sugar molasses are of this type. Accordingly, the polarizing current density should be approached but not exceeded for efficient and economic operation. When polarizing current densities are exceeded, operational instability usually results, evidenced by an increase, with time, of electrical resistance and an accompanying decrease of current efficiency. This effect is not easily reversible, and a return to non-polarizing current densities may show a more or less permanent increase in membrane resistance.

The onset of polarizing current densities is experimentally found to depend on solution conductance which is in turn controlled by the concentration of both electrolytes and non-electrolytes and by solution viscosity. Four generalizations can be made experimentally. (1) At a constant superficial solution velocity the polarizing current density is approximately proportional to solution conductivity; (2) for a given solution the polarizing current density is approximately proportional to the square root of the superficial velocity, which should be in excess of 5 cm. per second. It has been found that the current density to be non-polarizing should always be less than about ½ the product of the specific conductance of the solution in the diluting chambers and the square root of the superficial velocity of the solution in the diluting chambers, the current density expressed in amperes per square centimeter, the specific conductance in amperes per volt per cubic centimeter and the velocity in centimeters per second; (3) demineralization of the solution passing through the dilute chambers should be less than 90% in any one passage to avoid localized polarization and instability; (4) the optimum temperature for demineralization is about 60° C. Above 60° C. permselective membranes become increasingly unstable, while below 60° C. the resistance increases slowly. While 60° C. is optimum for most purposes, some successful operation may also be found in the range up to about 90° C.

Any method of operation which lowers the energy consumption at the expense of a proportional increase in the plant size is not usually economically sound. While the de-ashing of most sugar solutions at a low current density may require an extremely low energy input, the plant investment in most cases is so large as to make the process uneconomical. In order to render the process practical, it is necessary to use the maximum permissible currents. It will therefore be apparent that the conductance of the feed stream is an important factor in the demineralization of sugar solutions.

It has been found that for a given ratio of polyhydric non-electrolyte (e. g., sucrose) to electrolyte (e. g., ash) in aqueous solution that the maximum specific conductance (i. e., minimum specific resistance) occurs at a total concentration between about 20° and about 40° Brix and usually about 30° Brix. This relationship is clearly shown in the figure, where it can be seen that the minimum resistance on dilution of a sugar solution (corresponding to the maximum conductance) is found at about 30° Brix and that a range of from about 20° to about 40° Brix gives conductances which are not substantially different from that at 30° Brix, thus allowing the highest non-polarizing ash transfer to be employed in this range.

It is also apparent from the figure that, as the temperature increases to about 60° C., the conductivity becomes increasingly favorable, and it has been experimentally shown to permit an increase in maximum non-polarizing current density of about 50% over the maximum at room temperature (15° to 25° C.). It was also experimentally found that the rate of inversion of di- and poly-saccharides is not appreciable in the time required for demineralization up to about 75° C. at an essentially neutral demineralization and that the thermal stability of the permselective membranes is adequate.

It is apparent that in accordance with the present invention the concentration of the aqueous polyhydric solution to be demineralized should be controlled by the addition or removal (e. g., by evaporation) of water or other aqueous polyhydric solutions of differing concentration so that a Brix of from about 20° to 40°, or preferably about 30°, is obtained. This will result in the most economical and efficient demineralization of the solution. However, some results would also be obtained at a Brix of about 10° up to about 45° at temperatures up to 90° C.

The following examples are given to illustrate the invention where control of solution concentration and temperature of electrodialysis are demonstrated.

EXAMPLE 1

Hawaiian cane juice

A multi-membrane demineralizer unit shown in Fig. 1 of the Rosenberg application Ser. No. 428,072, noted hereinabove was constructed for use with various sugar solutions. A Hawaiian cane juice had the following analysis: sucrose 12%, invert 0.6%, sulfated ash 0.9%, organic non-sugars 1.0%, and water 85.5%. The cation membranes were based on sulfonate groups and had a resistance of 15 ohms per square centimeter. The anion membranes had a resistance of 25 ohms per square centimeter and was based on quarternary ammonium groups. These permselective ion exchange membranes and the method of making the same are clearly and specifically set forth in the application to Katz and Rosenberg, Ser. No. 300,302, noted above. It was found that by operating with this cane juice at 15° Brix and a superficial velocity of 45 cm./sec., a current density of 11 ma./cm.$^2$ was obtainable with no operational difficulty. On the other hand, increase of the current density to 15 ma./cm.$^2$ resulted in an unstable resistance which necessitated a voltage increase with time rising from initially 1.4 volts per cell pair to 3.5 volts per cell pair after 24 hours, at which time it was still rising. As opposed to this operation, the 11 ma./cm.$^2$ required 1.0 volt per cell pair initially and after 24 hours still required only 1.0 volt per cell pair.

Water was evaporated from another sample of this juice until a concentration of 30° Brix was obtained, and under these conditions an initial current density of 23 ma./cm.$^2$ was obtained at 1.2 volts per cell pair and remained stable over a 24-hour period. On the other hand, operation at 30 ma./cm.$^2$ caused a rapid rise in the voltage required to maintain this current density. A third sample of the Hawaiian cane juice was evaporated to a concentration of 50° Brix. In this case 1.4 volts per cell pair passed 12 ma./cm.$^2$, and this remained constant. On the other hand, increase of the current density to 14 ma./cm.$^2$ resulted in a tripling of the applied voltage over a period of 24 hours. In other words, the maximum current and salt removal was obtained at 30° Brix in stable operation, and either increase or decrease of this Brix resulted in a lower stable (i. e., non-polarizing) current density.

EXAMPLE 2

*Louisiana blackstrap molasses*

A sample of Louisiana blackstrap molasses of 80° Brix was treated in the membrane demineralizer of Example 1. The analysis was as follows: 36% sucrose, 32% invert, 8% sulfated ash, 6% organic non-sugars, and 18% water.

Addition of water to reduce the Brix to 40° indicated, at 20 cm./sec. flow, a stable current density of 40 ma./cm.$^2$ with no voltage change over a 24-hour period. A current density of 60 ma./cm.$^2$ was definitely non-stable in this system, and a voltage rise from 1.2 to 5.0 volts per cell pair resulted in 24 hours.

On the other hand, reduction of the Brix to 28° resulted in a stable current density of 90 ma./cm.$^2$ at a voltage of 1.0 volt per cell pair. Reduction of the Brix by further addition of water to 12° Brix resulted in a decrease in the stable current density to 30 ma./cm.$^2$, and it was impossible to obtain stable operation at 40 ma./cm.$^2$. It will be seen from the analysis that this polyhydric solution has a significantly different composition from that of Example 1, but the same general effect was found, namely, that the highest salt transfer per unit area per per unit time was obtained when a concentration of approximately 30° Brix was achieved. Note that in this example this concentration was effected by dilution, whereas for the cane juice of Example 1, it was obtained by concentration.

EXAMPLE 3

*Glycerine*

A process stream in the glycerine industry contains approximately 80% glycerine, 8% NaCl, and 12% water.

It was found that the maximum stable current density which could be achieved in the unit of Example 1 using the undiluted material was 10 ma./cm.$^2$, and at higher currents the unit resistance rose rapidly with time. On the other hand, addition of water to produce a solution 30% in glycerine, 3% in NaCl, and 67% in water (corresponding to about 33° Brix) at the same temperature and linear velocity resulted in a current density of 40 ma./cm.$^2$, with no deleterious effects. Dilution of the original glycerine solution to 10% glycerine, 1% NaCl, and 89% water resulted in a stable current density of only 20 ma./cm.$^2$, and it was found that at 30 ma./cm.$^2$ rapid rise of resistance with time was obtained.

EXAMPLE 4

*Dextrose*

In the dextrose industry a process stream is obtained containing as major constituents 20% dextrose and 0.03 N H$_2$SO$_4$.

It is, of course, desirable to reduce this acidity to allow sale of a non-acid-containing product. Treatment of this solution in membrane demineralizers at room temperature was found to result in a permissible current density of 6 ma./cm.$^2$. On the other hand, increase in temperature to 60° C. resulted in a stable current of 12 ma./cm.$^2$, and thus twice the acid transfer was achievable No deleterious effects of heat on the membranes were found. While higher temperatures permit higher stable (non-polarizing current densities), the ion-exchange groupings of the permselective membranes become increasingly unstable, and the pumps, piping, heat exchangers, etc., which carry the raw acid dextrose solution, are subject to corrosion at increasingly impractical rates. The latter problem may be solved only with heavy and undesirable capital expenditures.

Having thus disclosed our invention, I claim as new and desire to secure by Letters Patent:

1. In the demineralization of sacchariferous solutions in a multi-chamber electrodialysis unit wherein the chambers thereof are separated by permselective ion-exchange membranes, said solutions having minor components of electrolytes to be removed therefrom, the steps of adjusting said solutions to a concentration in the range of about 20° to about 40° Brix and to a temperature below about 60° C., passing said solutions at a velocity in excess of 5 centimeters per second through the diluting chambers of said multichamber electrodialysis unit, and passing a direct electric current through said unit.

2. In the demineralization of glycerine solution in a multichamber electrodialysis unit wherein the chambers thereof are separated by permselective ion-exchange membranes, said solution having minor components of electrolytes to be removed therefrom, the steps of adjusting said solution to a concentration in the range of about 20° to about 40° Brix and to a temperature below about 60° C., passing said solution at a velocity in excess of 5 centimeters per second through the diluting chambers of said multichamber electrodialysis unit, and passing a direct electric current through said unit.

3. In the demineralization of sacchariferous solutions in a multichamber electrodialysis unit wherein the chambers thereof are separated by permselective ion-exchange membranes, said solutions having a Brix greater than 40° with minor components of electrolytes to be removed therefrom, the steps of diluting said solutions to a range of about 20° to about 40° Brix, passing said solutions through the diluting chambers of said multichamber electrodialysis unit, and passing a direct electric current through said unit.

4. In the demineralization of sacchariferous solutions in a multichamber electrodialysis unit wherein the chambers thereof are separated by permselective ion-exchange membranes, said solutions having a Brix less than 20° with minor components of electrolytes to be removed therefrom, the steps of concentrating said solutions to a range of about 20° to about 40° Brix, passing said solutions through the diluting chambers of said multichamber electrodialysis unit, and passing a direct electric current through said unit.

5. The method of claim 1 wherein the solution is adjusted to a concentration of about 30° Brix.

6. In the demineralization of an aqueous solution of organic polyhydric nonelectrolyte in a multichamber electrodialysis unit wherein the chambers thereof are separated by permselective ion-exchange membranes, said solution having minor components of electrolytes to be removed therefrom, the steps of passing said solution at a velocity in excess of 5 centimeters per second at a temperature in the range of from room temperature to about less than 90° centigrade and at a concentration in the range of about 20 to 40° Brix through the diluting chambers of said multichamber electrodialysis unit, and passing a direct electric current through said unit.

7. The method of claim 6 wherein the solution is adjusted to a concentrate of about 30° Brix.

References Cited in the file of this patent

UNITED STATES PATENTS

| | | |
|---|---|---|
| 751,179 | Kollrepp et al. | Feb. 2, 1904 |
| 1,577,669 | Wolf et al. | Mar. 23, 1926 |
| 1,972,561 | Heubaum | Sept. 4, 1934 |
| 2,671,055 | Aten et al. | Mar. 2, 1954 |
| 2,694,680 | Katz et al. | Nov. 16, 1954 |
| 2,708,658 | Rosenberg | May 17, 1955 |